United States Patent
Simske et al.

(10) Patent No.: US 9,378,419 B2
(45) Date of Patent: Jun. 28, 2016

(54) CLASSIFYING IMAGES

(75) Inventors: Steven J Simske, Fort Collins, CO (US);
Malgorzata M Sturgill, Fort Collins, CO (US); Matthew D Gaubatz, Seattle, WA (US); Masoud Zavarehi, Corvallis, OR (US); Paul S Everest, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/364,729

(22) PCT Filed: Mar. 16, 2012

(86) PCT No.: PCT/US2012/029433
§ 371 (c)(1),
(2), (4) Date: Jun. 12, 2014

(87) PCT Pub. No.: WO2013/137908
PCT Pub. Date: Sep. 19, 2013

(65) Prior Publication Data
US 2014/0376811 A1    Dec. 25, 2014

(51) Int. Cl.
*G06K 9/62* (2006.01)
*G06K 9/00* (2006.01)
*G06K 9/46* (2006.01)
*G06Q 50/18* (2012.01)

(52) U.S. Cl.
CPC ........ *G06K 9/00577* (2013.01); *G06K 9/00536* (2013.01); *G06K 9/46* (2013.01); *G06Q 50/184* (2013.01); *G06K 2009/0059* (2013.01)

(58) Field of Classification Search
None
See application file for complete search history.

(56) References Cited

U.S. PATENT DOCUMENTS

| | | | |
|---|---|---|---|
| 7,421,136 B2 | 9/2008 | Sirohey et al. | |
| 7,809,155 B2 | 10/2010 | Nestares et al. | |
| 8,750,604 B2 * | 6/2014 | Tsuboshita et al. | 382/159 |
| 2005/0160271 A9 | 7/2005 | Brundage et al. | |
| 2007/0014443 A1 * | 1/2007 | Russo | 382/124 |
| 2007/0122037 A1 | 5/2007 | Shiiyama | |
| 2009/0074231 A1 | 3/2009 | Rancien | |
| 2009/0148068 A1 | 6/2009 | Woodbeck | |
| 2010/0091023 A1 | 4/2010 | Desruisseaux | |
| 2010/0106426 A1 | 4/2010 | Hunt et al. | |
| 2010/0195894 A1 | 8/2010 | Lohweg et al. | |
| 2011/0243461 A1 * | 10/2011 | Nayar | G06K 9/00281 382/224 |
| 2011/0280480 A1 | 11/2011 | Simske et al. | |
| 2015/0043630 A1 | 2/2015 | Minezawa et al. | |

FOREIGN PATENT DOCUMENTS

WO    WO-2010146771 A1    12/2010

OTHER PUBLICATIONS

Szummer et al., "Indoor-Outdoor Image Classification", IEEE publication, copyright 1997, pp. 42-51.*
Peterson, "K-nearest neighbor", Scholarpeia, 2009, 13 pages.*

(Continued)

*Primary Examiner* — Brian P Werner
(74) *Attorney, Agent, or Firm* — Leffert Jay & Polglaze, PA

(57) ABSTRACT

Methods, and apparatus for performing methods, for classifying an image. Methods include determining a corresponding set of metrics for each region of two or more regions of a pattern of regions of an image, and classifying the image in response to at least the corresponding set of metrics for each of the two or more regions of the pattern of regions.

13 Claims, 8 Drawing Sheets

(56) References Cited

OTHER PUBLICATIONS

Simske, et al., "A System for Forensic Analysis of Large Image Sets", Hewlett-Packard Laboratories, pp. 16-20, 2009.

Simske, et al., "Authentic Versus Counterfeit Image Classification after Re-Sampling and Compression", Hewlett-Packard Laboratories, pp. 1-1 to 1-5, 2010.

Simske, et al., "Selections of IBFS Friendly Regions Based or Features Specifically Geared to Imaging Forensics Responsiveness", Hewlett-Packard Laboratores, 4 pages.

Sturgill, et al. "System for Selective Feature Deployment for Multiple Imaging Devices", Hewlett-Packard Laboratories, 8 pages.

Steven J. Simske et al: "Document imaging security and forensics ecosystem considerations", Proc of the 10th ACM Symp on doucment Eng, Jan. 1, 2010, pp. 41-50.

* cited by examiner

CLASSIFYING IMAGES

BACKGROUND

Counterfeiting is a major concern for brand owners. It has been estimated that 8% of world trade could be counterfeit goods. This has the potential to create significant health, safety and security threats depending on the nature of the goods. As with other broad security concerns, elimination of counterfeiting is not practicable. It is thus generally important for brand owners to be able to identify counterfeiting.

DETAILED DESCRIPTION

Printing is often used to convey brands. It is thus important for brand owners to be able to determine whether printing was performed by an authentic or a counterfeit printer/label converter. Various implementations described herein seek to address this need.

As noted, it may not be practicable to expect to eliminate counterfeiting. A more practical and proactive plan may be to attempt to determine the relative size of each counterfeiter, and address the largest counterfeiters first. Since counterfeit material shows up through different channels, various implementations seek to facilitate identifying commonalities between a number of sample images. Samples exhibiting similar characteristics might be logically suspected of originating from the same source. As such, various implementations seek to classify images into like groupings based on metrics of various portions, or regions, of those images. Classification generally refers to a statistical process of identifying a sub-population to which an item of interest belongs on the basis of the analysis of metrics of the item of interest against a training set of data containing metrics from other items whose sub-populations are known. Known classifier engines include Bayesian classifiers, Gaussian classifiers, AdaBoost (Adaptive Boosting) classifiers, SVM (Support Vector Machine) classifiers, etc. While various implementations utilize the output of one or more classifiers, they are not tied to any single or particular type of classifier.

For various implementations, systems and methods are described that classify two or more regions of a pattern of regions for each image of a plurality of images. Classification utilizes a trained classifier engine. Sets of images are then farmed whose two or more regions have like classifications. A particular number of the sets of images having the largest memberships are then identified. Images of the remaining sets of images are then assigned to one of these identified sets of images.

Various implementations will be described with reference to one or more example images. It will be apparent that these implementations are extendable to a variety of images and image types. Such images could include photographs, graphics, charts, one-dimensional and two-dimensional code symbols (e.g., barcodes and QR codes), text, etc., or some composite of these elements. Images might include scanned images of external product packaging, scanned images of product labeling, scanned images of product inserts (e.g., quick-start guides, user guides, instructions, warnings, regulatory information, etc.), etc. Images might further include a composite images of two or more of the foregoing, such as a front panel and back panel of external product packaging, for example.

Figure 1A:
FIG. 1A depicts an example of an image for use with various implementations.

FIG. 1A depicts an example of an image 100 for use with various implementations. Rather than submit metrics of the image 100 to a classifier engine (e.g., a classifier) as a whole, various implementations sub-divide, e.g., tessellate, the image into a pattern of regions. The pattern of regions may include the entire image, or only one or more portions of the image. Images demonstrating a moderate to wide color gamut, areas of high and low saturation, and objects of different size, might be more easily and/or accurately classified. However, the methodology described herein may be applied against any image.

Figure 1B:
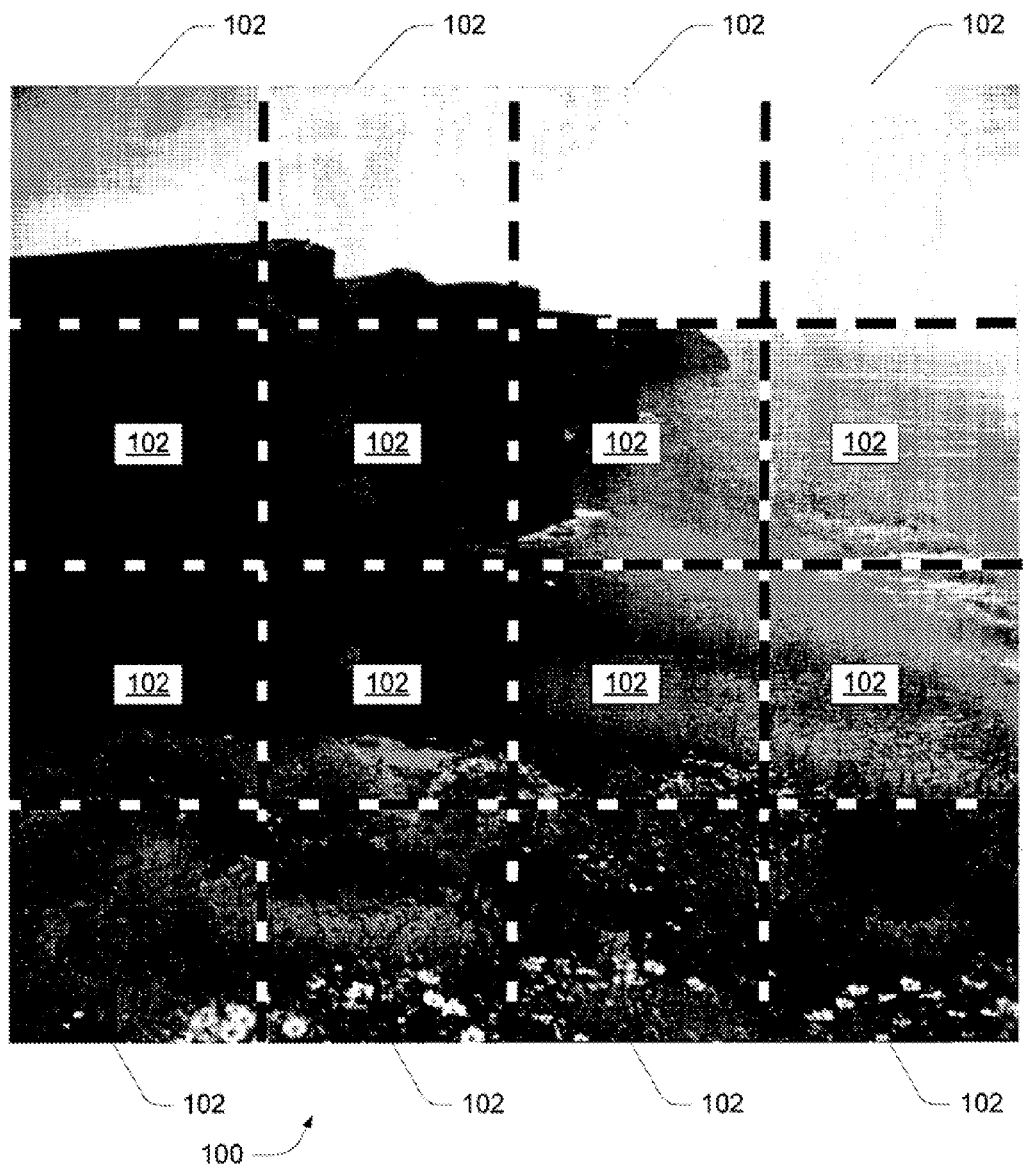
FIG. 1B depicts the image of FIG. 1A having a pattern of regions in accordance with an implementation.
Figure 1C:
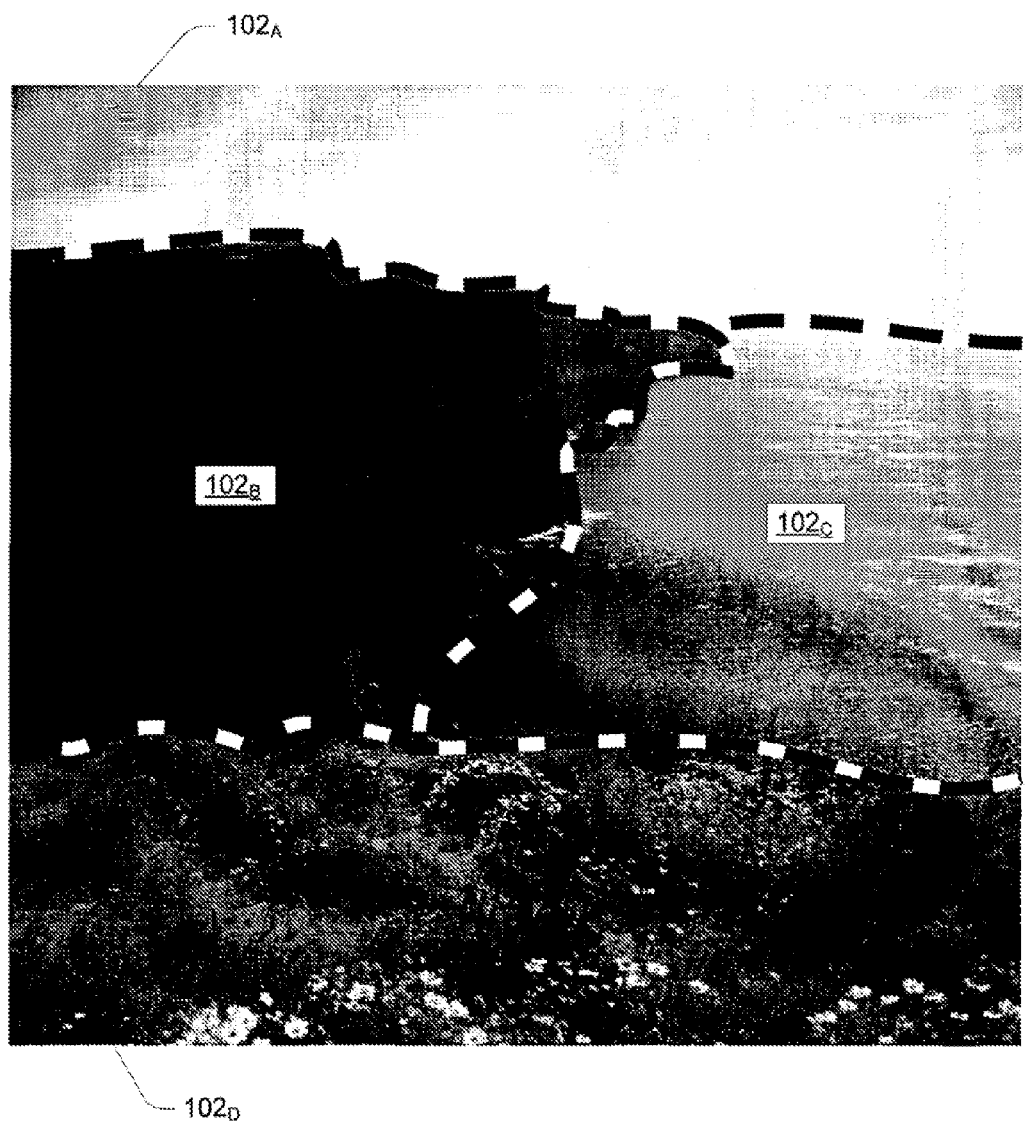
FIG. 1C depicts the image of FIG. 1A having a pattern of regions in accordance with another implementation.

The pattern of regions of the image 100 may be determined in a variety of manners. FIG. 1B depicts the image 100 of FIG. 1A having a pattern of regions 102 in accordance with an implementation. In the example of FIG. 16, image 100 has been divided in a predetermined (e.g., rectilinear) grid. FIG. 1C depicts the image 100 of FIG. 1A having a pattern of regions 102 ($102_A$-$102_D$ in this example) in accordance with another implementation. In the example of FIG. 1C, image 100 has been divided using image-segmentation based tessellation. Such image-segmentation techniques are understood in the field of computer vision/object recognition.

Other divisions of an image could also be utilized. For example, the pattern of regions could consider historical information such as knowledge of areas of an image, or types of image elements, where differences between authentic and counterfeit images have been more readily identified, or where accurate copying may be more difficult.

Figure 2:
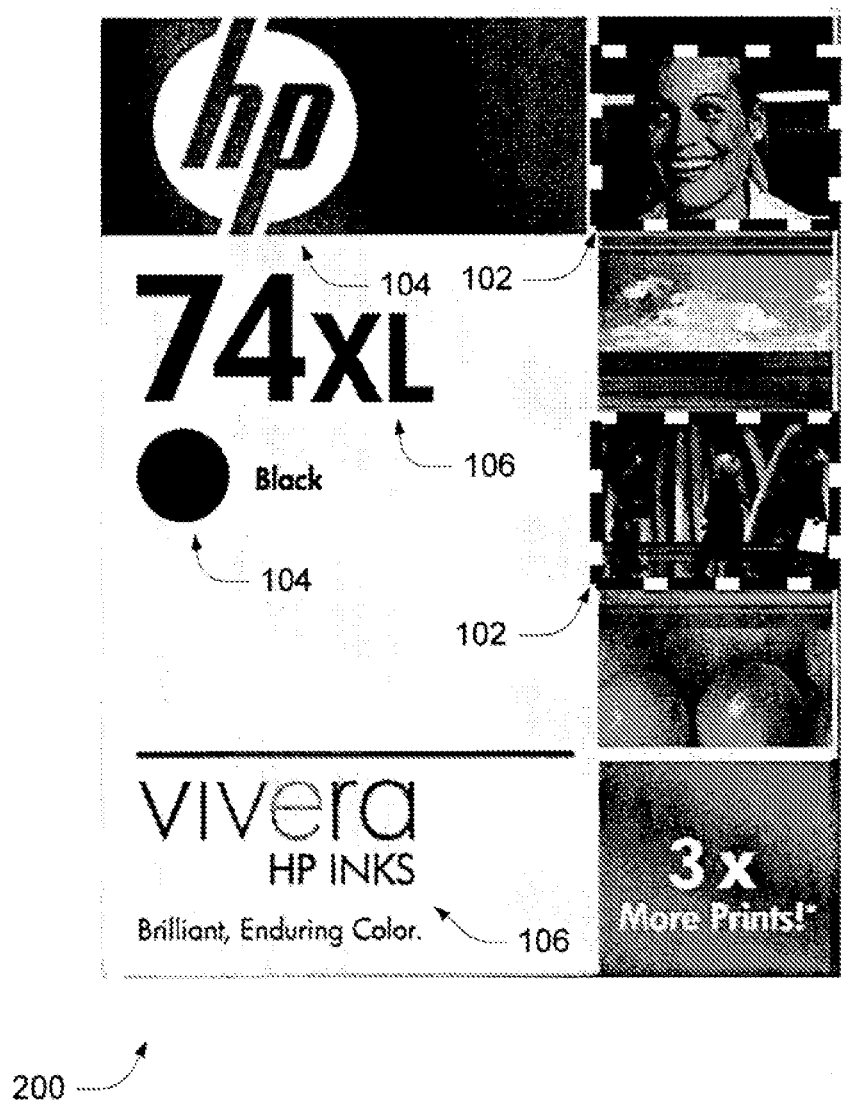
FIG. 2 depicts another example of an image and having a pattern of regions in accordance with an implementation.

FIG. 2 depicts an example of an image 200 and having a pattern of regions 102 in accordance with another implementation. The image 200 is representative of a front panel of a product packaging. As shown in FIG. 2, the pattern of regions 102 need not include the entire image 200. The image 200 contains graphic elements 104 and textual elements 106. Hypothetically, the graphic elements 104 and the textual elements 106 may have been disregarded in the selection of the pattern of regions 102 based on knowledge that these elements 104/106 historically provided little information useful in differentiating between authentic and counterfeit images, and the identified regions 102 may have been selected based on knowledge that these regions 102 provided a high level of information useful in differentiating between authentic and counterfeit images.

As another example, an image could be divided by detecting and selecting specific objects. For example, in the image 200, facial recognition could be performed to select regions of image 200 containing faces.

Figure 3:
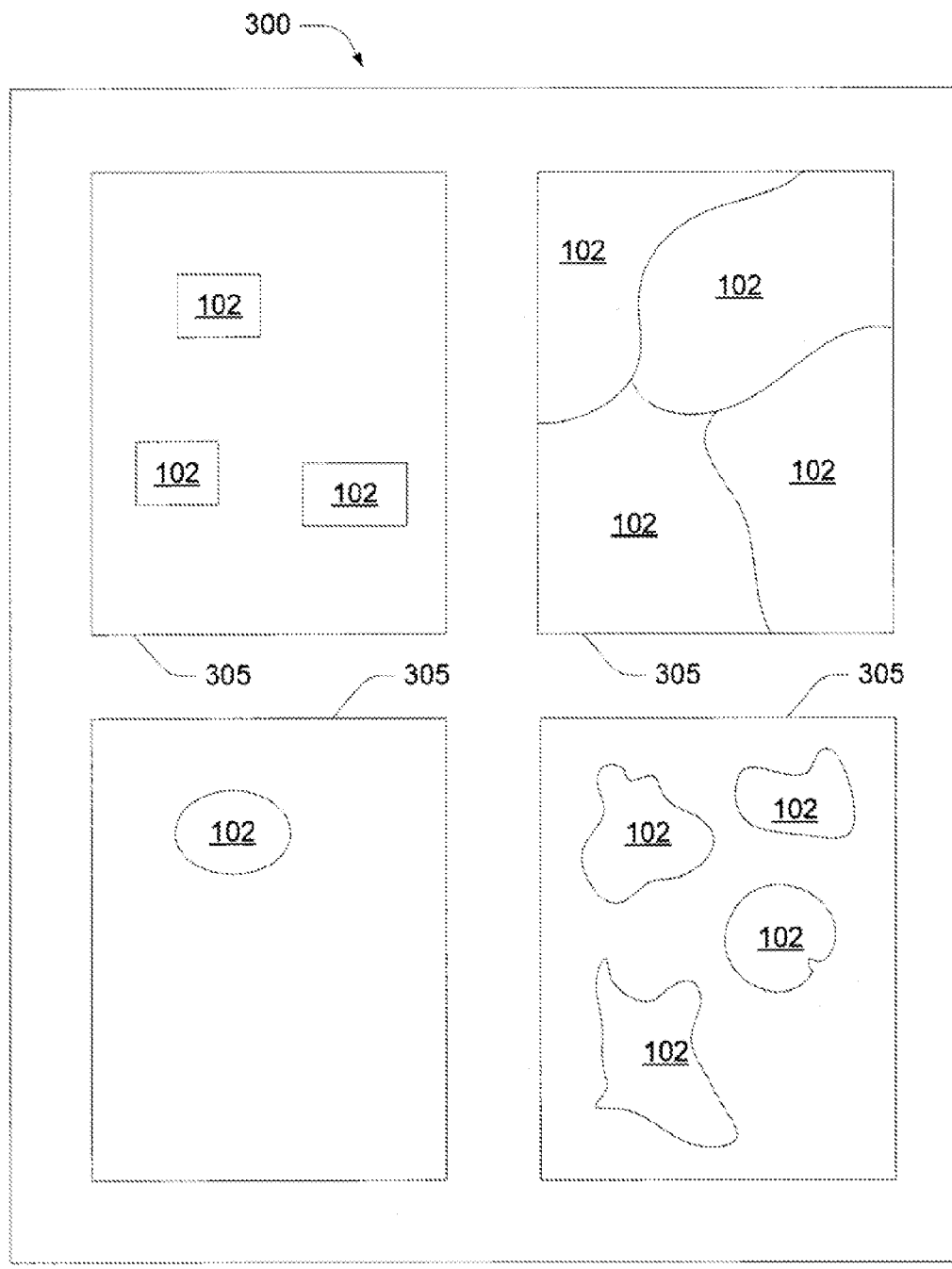
FIG. 3 depicts a further example of an image as a composite image and having a pattern of regions in accordance with an implementation.

FIG. 3 depicts a further example of an image 300 as a composite image and having a pattern of regions 102 in accordance with an implementation. The image 300 is depicted in this example to have four sub-images 305. The sub-images 305 might represent scanned images of different panels of product packaging, for example. As depicted in FIG. 3, each sub-image 305 might include one or more regions 102. The regions 102 of each of the sub-images 305 may collectively represent a pattern of regions 102 of the image 300.

Various implementations utilize one or more metrics, i.e., some quantification, of some aspect of two or more regions of the pattern of regions. It is noted that it may be that some metrics do not provide a positive contribution to the classification. For example, metrics with high variance may represent just "noise" in the system. Thus, some metrics may in fact be detrimental to the classification (e.g., the metrics contain a false signal or negatively contribute to variability), which can happen, for example, when the math used to calculate the metric includes a discontinuity (such as dividing by zero). There are several ways to address such concerns.

One method of mitigating detrimental metrics includes eliminating or discarding metrics that do not resolve to a finite set of Gaussian or near-Gaussian distributions. For example, if the distributions created by the clustering algorithm/aggregator are skewed, bimodal, flat, etc., then they are likely noisy and might be eliminated.

Another method of mitigating detrimental metrics includes eliminating or discarding metrics with a greatly different number of aggregates than the mean of all metrics. This may be implemented through weighting. For example, weighting may be inversely proportional to the difference in the number of aggregates obtained for the metric from the mean number of aggregates across all metrics.

Still another method of mitigating detrimental metrics includes eliminating or discarding metrics with lower aggregate-aggregate discrimination. For example, suppose that the mean number of aggregates is four, and, for the given metric, there are a default of six aggregates. If this overall metric distribution is then forced to fit into four aggregates, all metrics may be effectively normalized to the same distribution model. Then each metric can be directly compared based on a simple F-score of F=(Mean-Squared Error Between Aggregate Means)/(Mean-Squared Within the Aggregates). Mean Squared Error is simply sum squared error divided by the degrees of freedom (n-1). Metrics having better discrimination between the mean number of, or higher values of F, may provide more accurate classification. Forcing a distribution to a particular number of aggregates can be done in several ways, including direct aggregation when the number is higher, and splitting of the least Gaussian aggregates when the number is lower.

Although various implementations are not limited to a particular metric, example metrics could look to a variety of measureable aspects of each region of the pattern of regions. For example, each region could be mapped to transform an original RGB (red, green, blue) image as provided below:
  1: R channel
  2: G channel
  3: B channel
  4: Cyan, C=(G+B−R+255)/3, channel
  5: Magenta, M=(R+B−G+255)/3, channel
  6: Yellow, Y=(R+G−B+255)/3, channel
  7: Hue
  8: Saturation=max(R,G,B)*(1−min(R,G,B)/sum(R,G,B))
  9: Intensity=(R+G+B)/3
  10: Pixel Variance ("edge" space), the latter defined as the mean difference (in intensity) between a pixel and its four diagonally closest neighboring pixels.

Other mappings are possible. Regardless of the selected mappings, a variety of statistical analyses could be performed for each mapping. Example statistical analyses could include a variety of categories. A first category might be considered to be histogram metrics. Such metrics might include Mean, Entropy, StdDev, Variance, Kurtosis, Pearson Skew, Moment Skew, 5% Point (value of index in histogram below which 5% of the histogram lies), 95% Point (value of index in histogram below which 95% of the histogram lies), and 5% to 95% Span performed on one or more of the mappings. Other categories might be considered to be projection profile metrics for both horizontal and vertical profiles of the mappings. Such metrics might include Entropy, StdDev, Delta Entropy, Delta StdDev, Mean, Mean Longest Run, Kurtosis, Pearson Skew, Moment Skew, Delta Kurtosis, Delta Pearson Skew, Delta Moment Skew, Lines Per Inch, Graininess, Pet In Peak, Delta Mean. For the "Delta" metrics, the differences between consecutive profiles in the projection data might be used as the primary statistics.

It is noted that each region of the pattern of regions may utilize the same, different, fewer or additional metrics from other regions of the pattern of regions. In particular, it is noted that different regions of the pattern of regions may exhibit noise or undesirable variability for different metrics.

It is further noted that the methodology described herein can be robust to the damage of one or more of the images as aggregation can be based on a subset of regions of the pattern of regions. If regions are weighted, the weightings for the individual regions that are not damaged might be re-normalized. For example, referring back to the image 100 of FIG. 1C, suppose the pattern of regions 102 of image 100 has a by-region weighting of 0.4, 0.3, 0.2 and 0,1 for regions $102_A$, $102_B$, $102_C$, and $102_D$, respectively. Then, suppose there is damage to regions $102_B$ and $102_D$, as assessed, for example, by quality assurance/inspection/image matching means. Classification can be performed using only regions $102_A$ and $102_C$, whose weightings may now become 0.667 and 0.333, respectively, so that they might maintain the same relative proportion of the original weightings, yet sum to 1.0 (normalized).

Selection of regions can look to relative accuracy determined during training of a classifier engine using a training set of images of known authentic and counterfeit images. For example, each region could be assigned a particular accuracy weighting, such as a quantity inversely proportional to the error rate experienced with that region. For example, in the image 100 of FIG. 1C, region $102_D$ may have demonstrated the highest accuracy with the training set of images, and might be assigned an accuracy weighting of 1.00. Remaining regions $102_A$, $102_B$ and $102_C$ might have demonstrated lower accuracies, and might be assigned accuracy weightings of 0.11, 0.56 and 0.34, respectively. Where the accuracy weighting is inversely proportional to the error rate, the region $102_D$ would have demonstrated one-ninth the error rate of region $102_A$.

Selection of regions might include a particular number of the regions having the highest accuracy weightings. For example, if it were desired to select the two regions having the highest accuracy weightings in this example, the analysis would look to regions $102_B$ and $102_D$. Alternatively, selection of regions might include those regions whose accuracy weighting is greater than or equal to some threshold percentage of the highest accuracy weighting. For example, if the threshold percentage were 25%, the analysis would look to regions $102_B$, $102_C$ and $102_D$. Alternatively, selection of regions might include those regions whose accuracy weighting is greater than or equal to some threshold value. For example, if the threshold value were 0.5, the analysis would look to regions 102$_B$ and 102$_D$. It is noted that using a relative ranking can dynamically adjust the behavior of the system as more images are analyzed, while setting a fixed accuracy threshold might act as one type of quality control.

Figure 4:
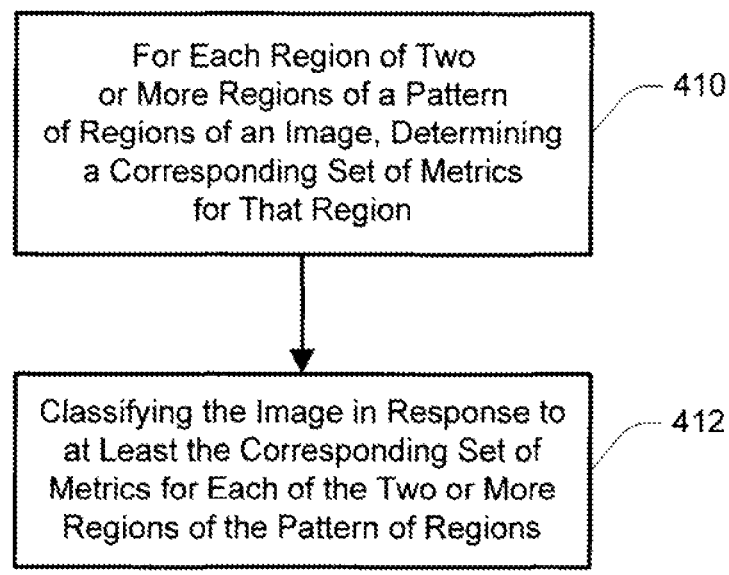
FIG. 4 is a flowchart of a method of classifying an image in accordance with various implementations.

FIG. 4 is a flowchart of a method of classifying an image in accordance with various implementations. At 410, a corresponding set of metrics is determined for each region of two or more regions of a pattern of regions for an image. The corresponding set of metrics for one region of the pattern of regions for the image includes one or more metrics, and may be different than the corresponding set of metrics for another region of the pattern of regions for the image. At 412, the image is classified in response to at least the corresponding set of metrics for each of the two or more regions of the pattern of regions. For example, suppose there are four regions of interest (A, B, C, and D) of a pattern of regions, and four metrics (W, X, Y, and Z) calculated for each of these regions. In furtherance of the example, suppose that $A_W$, $B_X$, $C_Y$ and $D_Z$ are the only positively contributing metrics, and the rest of the metrics are "noise" or negatively contributing. In such an example, it may be facilitate improved accuracy to keep only the metrics $A_W$, $B_X$, $C_Y$ and $D_Z$, and ignore metrics X/Y/Z for region A, metrics W/Y/Z for region B, metrics W/X/Z for region C and metrics W/X/Y for region D. In this example, the image could be classified in response to the metrics W, X, Y and Z for regions A, B, C and D, respectively, in a single pass of a classifier engine.

Figure 5:
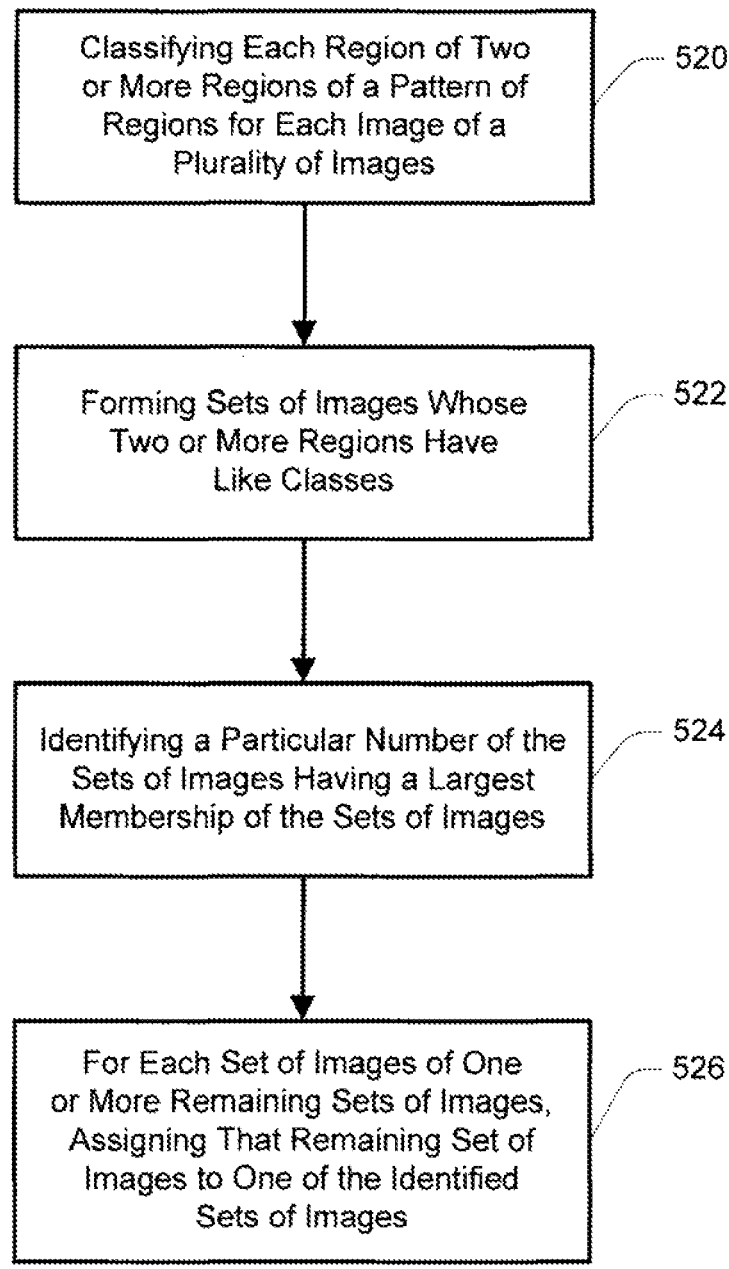
FIG. 5 is a flowchart of another method of classifying images in accordance with various implementations.

FIG. 5 is a flowchart of another method of classifying images in accordance with various implementations. At 520, each region of two or more regions of a pattern of regions is classified for each image of a plurality of images. For example, with reference back to the image 100 of FIG. 1C, regions 102$_B$ and 102$_D$ may have been selected from the pattern of regions 102. Assuming a sample of ten images, classification of the region 102$_B$ from each of the images might produce three clusters, or three classes, A, B and C. Similarly, classification of the region 102$_D$ from each of the images might produce four classes, D, E, F and G. Table 1 might be representative of the results of this example.

TABLE 1

| | Sample | | | | | | | | | |
|---|---|---|---|---|---|---|---|---|---|---|
| | 1 | 2 | 3 | 4 | 5 | 6 | 7 | 8 | 9 | 10 |
| Region 102$_B$ | A | A | A | B | B | B | B | C | C | C |
| Region 102$_D$ | D | D | E | E | E | F | G | F | F | G |

At 522, sets of images whose two or more regions have like classes are formed. Continuing with the example of Table 1, there are seven groupings of like classifications, i.e., A/D, A/E, B/E, B/F, B/G, C/F and C/G, which may be referred to as tessellated classes H, I, J, K, L, M and N, respectively. Thus, sets of images having like classes would include a set of class H whose members are samples 1 and 2, a set of class I whose member is sample 3, a set of class J whose members are samples 4 and 5, a set of class K whose member is sample 6, a set of class L whose member is sample 7, a set of class M whose members are samples 8 and 9, and a set of class N whose member is sample 10. The results of forming the sets are represented in Table 2.

TABLE 2

| | Sample | | | | | | | | | |
|---|---|---|---|---|---|---|---|---|---|---|
| | 1 | 2 | 3 | 4 | 5 | 6 | 7 | 8 | 9 | 10 |
| Set | H | H | I | J | J | K | L | M | M | N |

As seen by Table 1 and Table 2, region 102$_B$ resulted in three classes and region 102$_D$ resulted in four classes, which resulted in seven tesselated classes in this example. Note that the fact that n{H,I,J,K,L,M,N}=n{A,B,C}+n{D,E,F,G} in this example, where n{*}=elements in the array {*}, is merely coincidence. In general, n{tessellated classes}≥max[n{individual region classes}]. That is, the number of tessellated classes is always at least as large as the maximum of the number of classes for any of the two or more regions. Note that n{tessellated classes}, though discretized, is an absolute rating of each candidate region that can be used in comparative fashion.

Once the classes are fully tessellated to accommodate the results for the different regions, the sets of classes may be recombined. In the foregoing example, the class A for region 102$_B$ for sample 3 (of tessellated class I) might suggest it belongs to tessellated class H, while the class E for region 102$_D$ for sample 3 (of tessellated class I) might suggest it belongs to tessellated class J. For some implementations, a distance-based recombination is used to assign the set of tessellated class I to one of these other sets.

In a distance based recombination, a normalization for the variance (NV) between classes is computed to determine a relative value of each region for determining differences between samples. For example, for region 102$_B$ in the foregoing example, the normalization for the variance between {A}, {B} and {C} may be computed by multiplying the square of the distance between two class means by the number of samples in the two compared classes. This may be repeated for all comparisons and the final sum may be divided by the sum of all samples over all comparisons, i.e., $(N_C-1)*N_S$, where $N_C$=the number of classes, $N_C>1$, and $N_S$=the number of total samples in all classes, as defined in Equation 1:

$$N_S = \sum_{i=1}^{N_C} N_i \qquad \text{(Eq. 1)}$$

The formula for NV for a single image metric is given in Equation 2 below:

$$NV = \left( \sum_{i=1}^{N_C} \sum_{j=i+1}^{N_C} (\mu_i - \mu_j)^2 N_i N_j \right) \bigg/ \left( (N_c - 1) \sum_{i=1}^{N_C} N_i \right) \qquad \text{(Eq. 2)}$$

Where μ=the mean value of the metric for the class of interest. The relative weighting of NV for each region can be used to assign the weighting, $W_{ROI}$, of each region of interest for overall classification based on the set of metrics. The values for all NV are set to the ratio of their value to the value of a maximum NV (thus, the maximum NV is normalized to 1.0 in this case). Thus, $W_{ROI}$(max)=1.0 and all other $W_{ROI}$≤1.0 in this case.

Then the $W_{ROI}$ for each metric f may be summed for each region to determine an overall weight, Wi, for each region.

$$W_i = \sum_{f=1}^{N_F} W_{ROI}(i) \qquad \text{(Eq. 3)}$$

For some implementations, $W_{ROI}(i)$ in Eq. 3 could be multiplied by a metric weighting ($W_f$), if there were a desire to differentially weight the metrics, i.e., $W_f$ is not assumed to be 1.0 for all metrics. This option is shown in Eq. 3a. The metric weighting can be used to eliminate those metrics (features) that do not provide a positive contribution to the classification by setting $W_f$ to 0.0, for example.

$$W_i = \sum_{f=1}^{N_F} W_f W_{ROI}(i) \qquad \text{(Eq. 3a)}$$

The set of all $W_i$, which accounts for NV, the regions of interest and their metrics in total, can be used to assign some of the smaller classes to the larger classes. Since $N_C$ can vary for each region of interest, the geometric mean of the $N_C$ values for all M regions can be taken to be the final number of classes, $N_{final}$, after recombination:

$$N_{final} = (\text{int})[0.5 + \sqrt[M]{\prod_{i=1}^{M} N_c(i)}] \qquad \text{(Eq. 4)}$$

For the example of Table 1 and Table 2, $N_{final}=(\text{int})$ [3.964]=3. Thus, in furtherance of the example, to reduce the set {HIJKLMN} to three classes, the three largest classes in terms of membership might be selected as seed classes. As such, at 524, a particular number of the sets of images having a largest membership of the sets of images are identified. Although the particular number of sets was selected in this example based on a geometric mean of the $N_C$ values for all of the two or more regions, other criteria could be utilized to determine the particular number.

At 526, each set of images of one or more remaining sets of images is assigned to one of the identified sets of images. For some implementations, remaining sets of images can be assigned to one of the identified sets iteratively using weighted distances of the tessellated classes of the remaining sets of images ({IKLN} in the foregoing example) to the tessellated classes of the identified sets of images ({HJM} in the foregoing example). For some implementations, statistics of the tessellated classes of the identified sets of images can be recalculated after each remaining set is assigned or not, based on the relative variance between to-be-assigned and their assigned-seed-classes to the variance between to-be-assigned and the not-to-be-assigned-seed-classes. Distances between sets, such as for example {H} and {I}, can be defined in terms of the NV metrics above. For some implementations, the one or more remaining sets of images is less than all remaining sets of images. For example, it may be determined that a remaining set of images should not be assigned to one of the identified sets of images. As one example, distances between a remaining set of images and each of the identified sets of images might be great enough to indicate that the remaining set of images is distinct from each of the identified sets of images. For some implementations, the one or more remaining sets of images includes all remaining sets of images.

To continue with the example, suppose the closest of {IKLN} to one of {HJM} is set {I} to {H}. Next is {L} to {J}, then {K} to {J} and then {N} to {M}. The mean sum squared error (SSE) between these four sets of means (SSE-assigned) can be calculated and compared to the mean sum squared error of the other eight sets of means, i.e., {I} to {J}, {I} to {M}, {K} to {H}, {K} to {M}, {L} to {H}, {L} to {M}, {N} to {H} and {N} to {J} (SSE-not-assigned). For some implementations, if the ratio (SSE-assigned/SSE-not-assigned) is less than a particular threshold, {H} is updated with the data from {I} once it has been assigned, etc. This may change the assignment of remaining sets {KLN} to {HJM}. If the ratio (SSE-assigned/SSE-not-assigned) is greater than or equal to the particular threshold, the statistics for {HJM} are not updated as the smaller sets {IKLN} are assigned.

In various embodiments, the tessellated classes are recombined into a reduced number of $N_{final}$ classes. Note that this recombination approach can be used on a per-class basis, as well as a per-sample basis.

For further implementations, each region can be classified using more than one classifier engine. For example, if using P classifiers, where P>1, operating on each region of interest, P−1 new regions can be effectively created. That is, each independent classifier on each region can be classified, tessellated and recombined as described above. The tessellation and recombination can be performed as if there were P*R regions, where P=number of classifiers and R=number of regions for each image.

As an alternative, where ground truthing data is available, a combinational approach can be utilized in which the images are tessellated into regions of interest, and the classifiers are weighted differently for each part based on accuracy (e.g., inverse of error rate) and so the final weighting is a multiple of classification weighting for the region with the W as defined above.

It will be appreciated that implementations of the present disclosure can be instantiated by machine-readable instructions, e.g., software, configured to cause a processor to perform methods disclosed herein. The machine-readable instructions can be stored on non-transitory storage media in the form of volatile or non-volatile storage. Examples of storage media include solid-state memory (e.g., Read-Only Memory (ROM), Random-Access Memory (RAM), Flash memory, etc.); optical media (e.g., CD, DVD, Blu-Ray™ disks, etc.), magnetic media (e.g., magnetic disks and disk drives, magnetic tape, etc.). Such storage media may be a component part of a computer system, or it may include a removable storage medium.

Figure 6:
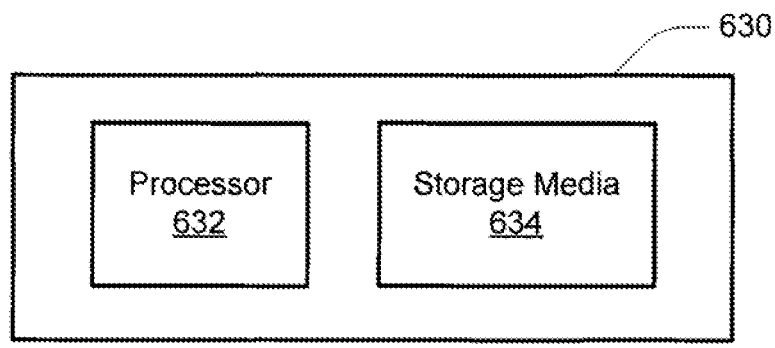
FIG. 6 is a block diagram of an example of a computer system for use with various implementations.

FIG. 6 is a block diagram of an example of a computer system 630 having a processor 632 and a tangible storage media 634 in communication with the processor 630 for use with various implementations. The storage media 634 includes a non-transitory storage medium and has machine-readable instructions stored thereon configured to cause the processor 632 to perform methods disclosed herein.

What is claimed is:

1. A method of classifying an image, comprising:
   determining a pattern of regions of an image by dividing the image in a predetermined grid, by using at least one of image-segmentation based tessellation, and detecting and selecting specific objects within the image, wherein the pattern of regions is determined based on historical data describing at least one of, portions of images that have been previously used to detect differences between authentic and counterfeit images, and portions of images where accurate copying is more difficult;
   for each region of two or more regions of the pattern of regions, determining a corresponding set of metrics; and
   classifying the image in response to at least the corresponding set of metrics for each of the two or more regions of the pattern of regions.

2. The method of claim 1, further comprising selecting the two or more regions of the pattern of regions in response to a relative accuracy rating between regions of the pattern of regions.

3. The method of claim 1, wherein determining a corresponding set of metrics for each region of two or more regions of a pattern of regions of an image comprises determining a corresponding set of metrics for each region of two or more regions of a pattern of regions of a composite image.

4. A method of classifying images, comprising:
classifying each region of two or more regions of a pattern of regions for each image of a plurality of images;
forming sets of images whose two or more regions have like classifications;
identifying a particular number of the sets of images having a largest membership of the sets of images; and
for each set of images of one or more remaining sets of imaging assigning that remaining set of images to one of the identified sets of images.

5. The method of claim 4, further comprising selecting the particular number of the sets of images using a geometric mean of a number of classes identified for each region of the two or more regions of the pattern of regions.

6. The method of claim 4, wherein classifying each region of two or more regions of a pattern of regions comprises classifying each region of the two or more regions of the pattern of regions using one or more classifier engines.

7. The method of claim 4, wherein assigning a remaining set of images to one of the identified sets of images comprises using a weighted distance of a tessellated class of that remaining set of images to tessellated classes of the identified sets of images.

8. The method of claim 7, further comprising recalculating statistics of one or more of the identified sets of images after each remaining set of images is assigned.

9. The method of claim 4, wherein classifying each region of two or more regions of a pattern of regions for each image of a plurality of images comprises:
for each region of the two or more regions of the patter of regions,
determining a corresponding set of metrics and
classifying the region in response to its corresponding set of metrics.

10. The method of claim 4, wherein assigning one or more remaining sets of images to one of the identified sets of images comprises assigning all remaining sets of images to one of the identified sets of images.

11. An apparatus for classifying an image, comprising:
a processor; and
a non-transitory storage media in communication with the processor, wherein the storage media has machine-readable instructions stored thereon configured to cause the processor to perform a method, the method comprising:
for each region of two or more regions of a pattern of regions of an image, determining a corresponding set of positively contributing metrics; and
classifying the image in response to at least the corresponding set of positively contributing metrics for each of the two or more regions of the pattern of regions,
wherein classifying the image in response to at least the corresponding set of positively contributing metrics for each of the two or more regions of the pattern of regions comprises classifying a plurality of images in response to at least the corresponding set of positively contributing metrics for each of the two or more regions of the pattern of regions for each of the plurality of images, and
wherein classifying a plurality of images comprises:
classifying each region of the two or more regions of the pattern of regions for each image of the plurality of images;
forming sets of images whose two or more regions have like classifications;
identifying a particular number of the sets of images having a largest membership of the sets of images; and
for each set of images of one or more remaining sets of images, assigning that remaining set of images to one of the identified sets of images.

12. The apparatus of claim 11, wherein assigning a remaining set of images to one of the identified sets of images comprises using a weighted distance of a tessellated class of that remaining set of images to tessellated classes of the identified sets of images.

13. The apparatus of claim 11, wherein assigning one or more remaining sets of images to one of the identified sets of images comprises assigning all remaining sets of images to one of the identified sets of images.

* * * * *